US010368327B2

(12) United States Patent
Keshet

(10) Patent No.: US 10,368,327 B2
(45) Date of Patent: Jul. 30, 2019

(54) METHOD AND SYSTEM FOR SIGNAL COMMUNICATIONS

(71) Applicant: Satixfy Israel Ltd., Rehovot (IL)

(72) Inventor: Arie Keshet, Ramat Efal (IL)

(73) Assignee: SATIXFY ISRAEL LTD., Rehovot (IL)

(*) Notice: Subject to any disclaimer, the term of this patent is extended or adjusted under 35 U.S.C. 154(b) by 276 days.

(21) Appl. No.: 15/354,913

(22) Filed: Nov. 17, 2016

(65) Prior Publication Data

US 2017/0111912 A1    Apr. 20, 2017

Related U.S. Application Data

(63) Continuation-in-part of application No. 15/310,886, filed as application No. PCT/IL2015/000023 on May 13, 2015.
(Continued)

(51) Int. Cl.
*H04W 56/00* (2009.01)
*H04B 7/185* (2006.01)
*H04W 84/06* (2009.01)

(52) U.S. Cl.
CPC ........ *H04W 56/00* (2013.01); *H04B 7/18513* (2013.01); *H04W 84/06* (2013.01)

(58) Field of Classification Search
CPC .............. H04B 7/18508; H04B 7/1851; H04B 7/18513; H04B 7/18521; H04B 7/18523;
(Continued)

(56) References Cited

U.S. PATENT DOCUMENTS 5,481,561 A    1/1996 Fang
5,663,734 A *  9/1997 Krasner .................. G01S 19/05
                                                    342/352
(Continued)

FOREIGN PATENT DOCUMENTS

CN    1799208 A       7/2006
CN    101043481       9/2007
(Continued)

OTHER PUBLICATIONS

International Search Report dated Feb. 14, 2018 of corresponding PCT application PCT/IL2017/051247.
(Continued)

*Primary Examiner* — Paul H Masur
(74) *Attorney, Agent, or Firm* — Browdy and Neimark, P.L.L.C.

(57) ABSTRACT

A method is provided for enabling communications between one or more satellites and a plurality of terminals wherein the plurality of terminals are divided into M groups of terminals and wherein the method comprising: forwarding a plurality of communication frames in a forward link, wherein said plurality of frames are divided into N sub-frames, and wherein traffic being carried along the forward link by each of the N sub-frames serves one or more groups of terminals associated with a respective satellite, and assigning, by a satellite return link scheduler, a respective capacity of the return link for at least one of the one or more groups of terminals, wherein the assignment takes into account which of the sub-frames is associated with that at least one group of the terminals.

25 Claims, 6 Drawing Sheets

Related U.S. Application Data

(60) Provisional application No. 61/992,948, filed on May 14, 2014.

(58) Field of Classification Search
CPC . H04B 7/1853; H04B 7/18539; H04W 56/00; H04W 84/06
See application file for complete search history.

(56) References Cited

U.S. PATENT DOCUMENTS

| | | | |
|---|---|---|---|
| 6,463,040 B1 | 10/2002 | Dutta | |
| 6,504,855 B1 | 1/2003 | Matsunaga | |
| 7,035,311 B2 * | 4/2006 | Nohara | H04B 1/713 375/132 |
| 8,010,043 B2 | 8/2011 | Miller | |
| 9,143,271 B2 | 9/2015 | Hong et al. | |
| 9,461,701 B1 * | 10/2016 | Mitchener | H04B 1/7156 |
| 9,735,940 B1 | 8/2017 | Bakr et al. | |
| 2002/0054632 A1 * | 5/2002 | Chuang | H04L 25/0204 375/224 |
| 2003/0086512 A1 * | 5/2003 | Rick | G01S 5/0221 375/343 |
| 2004/0101046 A1 | 5/2004 | Yang et al. | |
| 2004/0114547 A1 | 6/2004 | Christodoulides et al. | |
| 2006/0176984 A1 | 8/2006 | Lee et al. | |
| 2007/0085736 A1 * | 4/2007 | Ray | G01S 19/21 342/357.59 |
| 2007/0126612 A1 | 6/2007 | Miller | |
| 2007/0248076 A1 | 10/2007 | Ji et al. | |
| 2009/0023384 A1 | 1/2009 | Miller | |
| 2009/0285151 A1 | 11/2009 | Eidenschink et al. | |
| 2010/0128660 A1 | 5/2010 | Becker et al. | |
| 2011/0032920 A1 * | 2/2011 | Suberviola | H04B 1/7075 370/342 |
| 2011/0268017 A1 | 11/2011 | Miller | |
| 2012/0207144 A1 * | 8/2012 | Bouvet | G01S 19/246 370/342 |
| 2013/0177061 A1 * | 7/2013 | Ram | H04L 7/042 375/226 |
| 2013/0331026 A1 | 12/2013 | O'Neill et al. | |
| 2014/0226682 A1 | 8/2014 | Becker et al. | |
| 2014/0369450 A1 | 12/2014 | Leyh et al. | |
| 2016/0182189 A1 | 6/2016 | Stadali et al. | |
| 2017/0104520 A1 | 4/2017 | Rainish | |

FOREIGN PATENT DOCUMENTS

| | | |
|---|---|---|
| CN | 101573891 A | 11/2009 |
| CN | 101908920 A | 12/2010 |
| CN | 102461195 | 5/2012 |
| CN | 103701740 A | 4/2014 |
| WO | 2008100341 A2 | 8/2008 |
| WO | 2011027688 A1 | 3/2011 |
| WO | 2012038380 A1 | 3/2012 |
| WO | 2015/177779 A1 | 11/2015 |

OTHER PUBLICATIONS

Fernandez et al., A heuristic Algorithm for the Resource Assignment Problem in Satellite Telecommunication Networks, 20th RCRA International Workshop Conference Proceeding, pp. 1-14 (2013).

Noussi et al., Broadband Satellite Links over Rain-Affected Wide Areas, University of Portsmounth, pp. 1-5 (2004).

IITU-R Recommendation No. P.618 entitled Propagation data and prediction methods required for the design of Earth-space telecommunication systems, pp. 1-26 (2013).

* cited by examiner

METHOD AND SYSTEM FOR SIGNAL COMMUNICATIONS

TECHNOLOGICAL FIELD

The present disclosure generally relates to the field of communications and more particularly, to techniques for carrying out communications in communication networks such as satellite communication.

BACKGROUND OF THE DISCLOSURE

The term "satellite system(s)" referred to hereinbelow, should be understood to encompass any one or more members of the group that consists of geo-stationary satellite systems, Low Earth Orbit ("LEO") satellite systems and Medium Earth Orbit ("MEO") satellite systems and other types of platforms such as High-Altitude Platforms ("HAP") which are quasi-stationary aircrafts that provide means of delivering a service to a large area while remaining in the air for long periods of time, High-altitude, long-endurance unmanned aerial vehicles ("HALE UAV"), and the like.

In a typical satellite communications network a portion of the available capacity is allocated for hub-to-satellite communications in the forward link. Similarly, a portion of the return link capacity is allocated for satellite-to-hub communications. Although these portions of the link capacity, allocated for communicating with the hub, (also referred to as an earth station, gateway or teleport), are not discussed explicitly in the following description, still, it should be noted that the methods and air interface protocols discussed in the following disclosure may as well, and typically are, implemented in such a hub, in case where the satellite serves merely as a "bent pipe". Namely, the satellite does not process the signals it receives other than carrying out a basic filtering thereon and shifting them in frequency.

In various satellite communication systems Frequency Division Duplexing (FDD) is used. Different frequencies are used for the forward traffic (i.e. traffic transmitted from the satellite to the terminals) and for the return traffic (i.e. traffic transmitted from terminals to the satellite) of the RF link.

Typically, for the capacity portions allocated in the uplink (namely, for transmitting hub to satellite communications and terminal to satellite communications) the allocated frequency is substantially different from the frequency allocated for carrying out downlink communications (i.e. satellite to hub communications and satellite to terminal communications), using the capacity portion allocated therefor.

General Description

In various communication systems/network terminals that cannot receive traffic while they are transmitting traffic. In order to accommodate this limitation, and at the same time make efficient use of both uplink and downlink capacity, the system/network must perform specialized forward link multiplexing and return link capacity assignment.

The term terminal refers in general to an end station of a communication system connected to the end user of the system. In the context of a two way satellite communication system the term refers to the ground station used by the consumer while the term hub or gateway refers to the ground station which serves the service provider.

One approach for scheduling the transmissions is to perform on-the-fly transmit-receive conflict resolution without imposing any limitation on the terminals by inducing a framing mechanism thereon. To do that, a scheduler must ensure that packets are only multiplexed onto the forward link at such times that they arrive at the terminal when it is not transmitting. This means, in turn, that the forward link multiplexer must maintain a separate queue for each (active) terminal and, in addition, track the propagation delay between the satellite and that very same terminal. Once every return link time slot, and for each non-empty output queue, the scheduler would use the delay information to consult the return link capacity allocation matrix in order to check whether, at the projected time of forward link packet reception, the terminal is scheduled to transmit or not. The scheduler must then serve fairly the non-blocked queues. In addition, scheduling must allow terminals certain pre-agreed short transmission windows for random-access return link transmissions. Finally, return link capacity allocation must keep a terminal's transmission duty cycle below 100% to ensure that it can send forward link traffic without excessive delay.

Transmit-receive scheduling also impacts terminal handover between beams and satellites. With the scheme described above, the scheduler must be involved in each handover in order to make sure that forward link data is correctly re-routed.

It is an object of the present disclosure to provide a transmit-receive framing mechanism that simplifies substantially scheduling, streamline satellite and beam switchover.

It is another object of the present disclosure to provide a transmit-receive framing mechanism in which most of the complexity involved in routing and handover is shifted from the satellite to the gateway and the terminals.

It is still another object of the present disclosure to provide a novel method for enabling communications between one or more satellites and a plurality of terminals, wherein the plurality of terminals are divided into M groups of terminals.

According to a broad aspect of the present invention there is provides communication terminal adapted for receiving a plurality of designated communication sub-frames transmitted in a forward link from a satellite and/or from a data gateway and/or from another data communication mediator, to the terminal. The communication terminal is associated with a certain group of one or more respective groups of communication terminals, and each designated communication sub-frame is a respective portion of a communication frame, which transmitted from the data communication mediator (e.g. satellite) in the forwards link. The designated communication sub-frame includes N communication sub-frames designated to serves respective one or more groups of communication terminals. The satellite communication terminal includes:

(i) a scheduling module configured and operable for determining a time slot of the designated communication sub-frame within the communication frame transmitted by the communication mediator (satellite). The scheduling module may for example include:
 a forward link scheduler configured and operable for assigning a forwards link schedule for receiving said designated communication sub-frame at said time slot; and
 a return link scheduler configured and operable for assigning a return link schedule for transmitting information to the satellite during time slots other than said time slot of the designated communication sub-frame; and (ii) a signal receiving module associated with the scheduling module and configured and operable for performing signal receipt operation during the forwards link schedule for receiving and processing said designated sub-frame of the communication frame transmitted in the forward link from the communication mediator (satellite).

According to some embodiments the signal receiving module includes a signal acquisition system configured and operable to process at least a part of the communication frame received in the forward link from the communication mediator (satellite) and to lock on to the designated communication sub-frame by identifying at least one code word in the received signal designating the designated sub-frame, and determining a time index (sample position) at which the code word is encoded in the received signal and a carrier frequency over which the code word is encoded in the received signal.

According to another broad aspect of the present invention there is provided a signal acquisition system. The signal acquisition system includes:

(i) an input module adapted to obtain a received signal (e.g. EM signal), which encodes communicated data over a certain unknown carrier frequency. The certain unknown carrier frequency may be any one of a plurality of possible carrier frequencies residing within a predetermined frequency band.

(ii) a signal time frame processor connectable to the input module and configured and operable for continuous processing of time frame portions of the received signal to identify at least one code word of a group of one or more predetermined code words, being encoded in a time frame portion of the received signal. The signal time frame processor includes:

a. a carrier frequency analyzer module configured and operable for analyzing the time frame portion of the received signal in conjunction with the plurality of possible carrier frequencies simultaneously. This is achieved by transforming the time frame portion to generate carrier-data including a plurality of carrier-data-pieces associated with each possible carrier frequency of the plurality of possible carrier frequencies respectively. Each of the carrier-data pieces is indicative of data encoded in the time frame portion over a carrier frequency associated with the respective carrier-data piece; and b. a convolution module configured and operable for processing the time frame portion of the signal to simultaneously identify whether the time frame portion encodes said at least one code word, over any one of the a plurality of possible carrier frequencies.

The signal acquisition system also includes an output module configured and operable for outputting identification data indicative of identification of said code word in the signal.

To this end, the signal acquisition system is adapted to determine a time index of said code word in the received signal based on the time frame portion of the received signal at which said the code word is identified, and the output module is adapted to output the time index. The time frame processor is adapted to process the carrier data to identify the carrier-data piece, which encodes significant data and thereby determine the carrier frequency of the received signal. The output module is further adapted to output the determined carrier frequency.

The invention also provides a satellite communication terminal adapted for receiving a plurality of designated communication frames transmitted in a forward link from a satellite to said terminal, wherein said satellite operates in a beam-hopping mode and said communication terminal is associated with a certain group of one or more respective groups of communication terminals associated with respective beams transmitted by said satellite in said beam-hopping mode;

wherein the satellite communication terminal comprises a signal receiving module configured and operable for performing signal receipt operation during a forwards link transmission of a respective beam of the beam-hoping mode which is associated with the certain group for receiving and processing the communication frame transmitted in said forward link from said satellite; and wherein said signal receiving module comprises the above-described signal acquisition system configured and operable to process at least a part of the communication frame received in the forward link from said satellite and to apply carrier locking on to a carrier frequency of said respective beam by identifying at least one code word in the respective communication frame and determine a time index at which said code word is encoded in the received signal and a carrier frequency over which said code word is encoded in the received signal.

Other objects of the invention will become apparent as the description of the invention proceeds.

In the following description it is assumed that the air interface's forward link uses one or more TDM carriers, whereas its return link uses a reservation access scheme such as Multi-Frequency Time Division Multiple Access (MF-TDMA).

A key aspect of the air-interface of the present disclosure is its ability to accommodate the inability of the terminal to receive communications while being in a mode of transmitting communications. A frame that is used for the forward link, is divided into N—for example 4—equal length sub-frames. A forward link stream carried by each sub-frame will serve 1/N—one fourth using the same example—of the terminal population in a beam. The satellite return link scheduler will assign capacity to terminals, while taking into account their sub-frame association. This scheme simplifies scheduling by the satellite and allows the terminals to be grouped for addressing over the forward link, and to save receiver power.

A forward link super-frame structure, taken together with signaling e.g. over a DVB-S2 (or any other applicable standard) PL ("Physical Layer") header, is used to alert terminals which are in stand-by mode to a forward link traffic that is queued and is about to be transmitted to them.

Beam and satellite handover may optionally but not necessarily rely on a system-wide GPS-grade time-base; terminal geo-location information; accurate satellite orbital data, communicated to the terminals through layer 2 signaling over the forward link; and the framing scheme described hereinabove. These enable the gateway and the terminal, running both identical, bit-exact coverage calculation routines, to be synchronized for traffic routing and beam/satellite selection that requires minimal signaling.

Beam or satellite switchover for terminals that are in a stand-by mode or are currently receiving data, will involve no signaling and will be done with no interruption to the traffic. Return link transmission during switchover involves exchanging modified capacity request messages. It is preferably seamless during intra-satellite switchover and nearly so between satellites.

According to an embodiment of the present disclosure there is provided a method for enabling communications between one or more satellites and a plurality of terminals wherein the plurality of terminals are divided into M groups of terminals and wherein the method comprising:

forwarding a plurality of communication frames in a forward link, wherein the plurality of frames are divided into N sub-frames, and wherein traffic being carried along the forward link by each of the N sub-frames serves one or more groups of terminals associated with a respective satellite, and assigning, by a satellite return link scheduler, a respective capacity of the return link for at least one of the one or more groups of terminals, wherein the assignment takes into account which of the sub-frames is associated with that at least one group of the terminals.

According to another embodiment, the terminals belonging to the at least one group of terminals are characterized in that they cannot receive communications while they are transmitting communications.

In accordance with another embodiment, each of the at least one group of terminals is further divided into sub-groups, and a Physical Layer Header (PL-Header) of each of the forward link communication frames specifies at least one of the sub-groups, and wherein each communication frame carries traffic addressed to the at least one sub-group specified in the respective PL-Header.

By still another embodiment, each terminal is configured to decode every PL-Header of the forward link communication frames, and wherein the method further comprises a step whereby if the PL-Header carries a an indication of a sub-group that matches the sub-group of terminals to which a respective terminal belongs, the respective terminal will decode the entire communication frame, and if the PL-Header carries an indication of a sub-group that does not match the sub-group of terminals to which a respective terminal belongs, the respective terminal will not decode the respective entire communication frame.

In accordance with yet another embodiment, in a case where the PL-Header carries an indication of a sub-group that does not match the sub-group of terminals to which a respective terminal belongs, the respective terminal is configured to power down its receiver for the duration of the entire communication frame.

According to another embodiment, the method provided further comprises a step of alerting terminals from among the plurality of terminals which are currently in a stand-by mode, that traffic that is destined to them is currently being queued and is about to be transmitted to them.

In accordance with yet another embodiment, each of the N sub-frames comprises a baseband frame, and wherein all of the base-band frames are of a fixed, pre-defined length, having different modulations and/or different codes.

In accordance with another aspect, a method is provided for enabling communications between one or more satellites and a plurality of terminals, wherein the one or more satellites are configured to communicate with the plurality of terminals belonging to a public network through at least one gateway, and wherein the plurality of terminals and the at least one gateway are configured to execute identical, bit-exact satellite coverage calculation routines, synchronized for traffic routing and beam/satellite selection with minimal signaling.

According to another embodiment of this aspect, each of the plurality of terminals is configured to generate requests for allocation of return link capacity in another beam or a different satellite, thereby when a terminal switches a beam or a satellite, it is able to immediately utilize said allocated capacity over the new (switched-to) beam or at the new satellite.

In accordance with another embodiment, the terminal is configured to:

accept initial geolocation information and to carry out a coarse alignment procedure; and execute a calibration routine that allows fine-aligning of its orientation and tilt based on reception of communications sent by the terminal to the respective satellite.

By yet another embodiment, the one or more satellites are configured to:

use gateway-referenced mechanism to establish a system-wide Time of Day (ToD) time base; and to periodically broadcast information that specifies the information that relates to a respective satellite of the one or more satellites.

According to still another embodiment, adaptive acquisition time is allocated for a period of time required for carrying out an inter-beam switchover and/or inter-satellite switchover.

In accordance with another embodiment, the satellite system is a member selected from a group that consists of: a Geo Stationary system, a LEO system and a MEO system.

BRIEF DESCRIPTION OF THE DRAWINGS

The present invention will be more fully understood from the following detailed description of the embodiments thereof, taken together with the drawings which.

DETAILED DESCRIPTION OF THE DISCLOSURE

Figure 1:
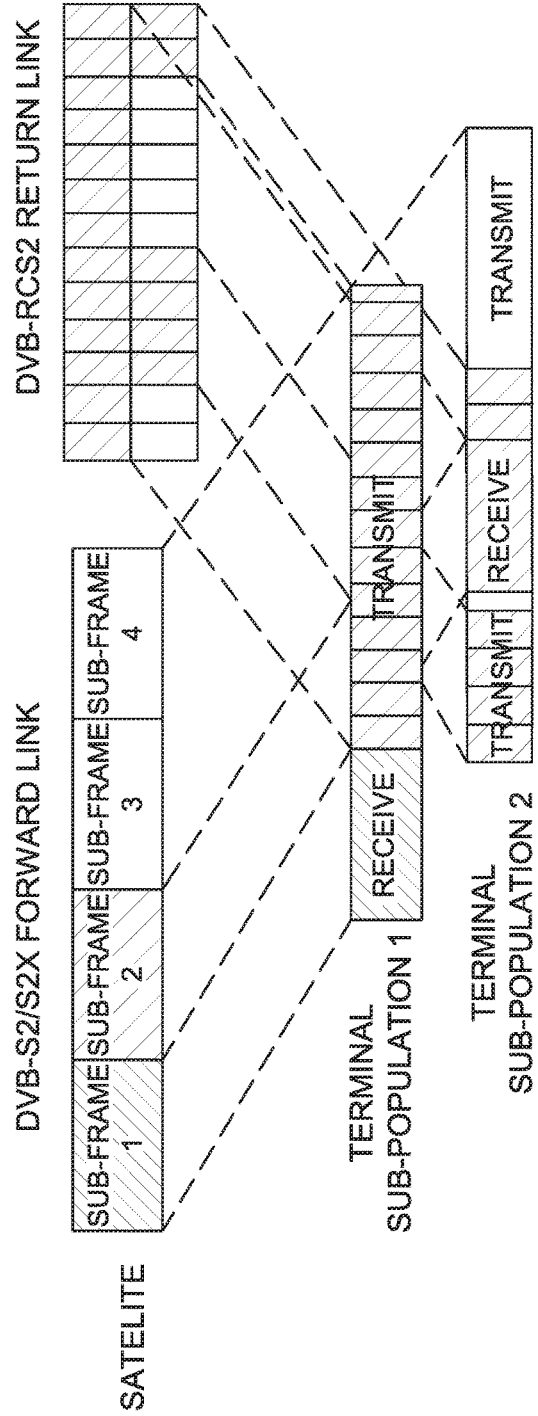
FIG. 1 illustrates an example scheme for transmit-receive scheduling.

In the description below, for some specific not limiting examples, of the use of the technique of the invention for particular protocol/standards such as DVB-S2 and in DVB-S2X Standards, the following terminology is at times used, and may be interpreted as follows with respect to these specific examples. However, it should be understood that for the general concept of the invention relating to general signal communication, these terms should interpreted broadly in accordance with their general/functional meaning in the field.

General Scheme and Relevant Standards

For the forward link, a single-carrier non-spread modulation is preferably used, e.g. as in the DVB-S2 and in DVB-S2X Standards (ETSI EN 302 307-1 and EN 302 307-2), while for the return link, a Multi-Frequency Time Division Multiple Access (MF-TDMA) may be used, e.g. DVB-RCS2 standard, (EN 301 542-2).

Other transmission techniques, although possible, are not too suitable for a satellite link which is mainly a clear line-of-sight channel, with a very high SNR sensitivity. The CDMA technique generates self-interference and is therefore less power efficient. On the other hand, S-MIM (ETSI TS 102 721-1 that has been developed to address the self-interference issue), is too complex for cost-effective implementation on board the satellite.

The OFDM technique, which has been adopted for use in cellular and wireless LAN networks, provides significant advantages for obstructed multipath rich channel, but it requires a large HPA back-off and is more sensitive to phase noise. In addition, the benefits of all the above techniques in multipath channels do not come into play in a Ku-band, stationary terminal scenario.

1. Forward Link

The forward link of the present invention is somewhat similar to a DVB-S2/S2X link but is characterized by having at least the following differences when compared with a DVB-S2/S2X link:

A modified Physical Layer (PL) header provided by the present invention that is characterized in that it: (a) enables combined low-SNR and high-SNR adaptive coding and modulation (ACM); and (b) includes a larger payload of mode-setting bits. Base-band frames have a constant length in symbols (and may carry a number of bits that varies by the modulation currently used).

2. Return Link

The return link of the present invention is somewhat similar to a DVB-RCS2 link but is characterized by having at least the following difference when compared with a DVB-RCS2 link: certain MAC messages include additional, non-standard information such as the terminal's location and sub-population assignment.

Physical Layer (PHY)

1. Forward Link

The forward link PHY is somewhat similar to the definition provided in the DVB-S2/S2X standard, but is characterized by having at least the following differences when compared with a DVB-S2/S2X link:

An extended Physical Layer Header (PL-Header) includes a longer Start Of Frame ("SOF") sequence in order to ensure a first-time acquisition, and a longer Physical Layer Signaling ("PLS") field which comprises more signaling bits. The PLS is preferably used to signal at least one of the following:

Forward Link Frame and Super-frame boundaries;
Terminal grouping; and
Terminal alert messages For low-SNR operation, the baseline header described above may be extended to include a longer SOF sequence (based on the standard SOF), and additional FEC bits for the PLS field. To maintain a constant base-band frame length, low-SNR frames may use punctured LDPC codes. The forward link may be capable of supporting mixed operation of baseline (high-SNR) and low-SNR base-band frames.

2. Return Link

The return link PHY is somewhat similar to that as defined by DVB-RCS2 PITY.

Transmit-Receive Scheduling

The present invention provides a transmit-receive framing mechanism that greatly simplifies scheduling and streamline satellite and beam switchover. Moreover, it transfers most of the complexity of routing and handover from the satellite to the gateway and the terminals. This comes at the cost of modest framing delay and a somewhat lower terminal transmission duty cycle (75% for the example of 4 sub-frames, compared with a best-case of over 90%).

Frames' Scheduling

When implementing the DVB-S2/S2X standard, the term "a baseband frame" relates to a frame that contains a number of payload (user information) bits, which varies between 2432 to 53760. The destination of this information can be to one user (a terminal) or to many users (when operating in a broadcast mode, or in a time-division mode).

A base-band header is added to these payload bits and the whole frame is then encoded, modulated to symbols and framed into a Physical Layer Frame (PL-Frame), which contains between 3330 to 33282 symbols. Obviously, a terminal receiving such a PL-frame has first to decode the header of the PL-frame, in order to be able to access the data contained in that frame.

The symbols may be transmitted at different rates, depending on the allocated bandwidth at the satellite. In the following examples, we assume a rate of 500 Msps (which is supported by High-Throughput satellites), so that if one takes for example a fixed PL-frame of 32400 symbols it would take 64.8 microseconds for that PL-frame to be transmitted. Note that 500 Msps. Other transmission rates may be 36 Msps, or 72 Msps, which are currently more common. At these rates, the time required to transmit a 32400 symbols long PL frame would be 0.9 msec or 0.45 msec, respectively.

A sub-frame of 0.5 msec comprises about 8 PL-Frames when using a 500 Msps rate. However, when dealing with longer PL-frames, the length of the frames according to the present disclosure will have to be modified, since a PL-frame cannot be divided into several sub-frames.

In the following disclosure a time period of 2 msec is exemplified as being associated with a communication frame, which is the equivalent of having 16 PL-frames. A super-frame that comprises 5 communication frames, will therefore comprise 80 PL-frames.

In other words, the term "sub-frame" refers herein throughout the specification and claims to an entity that comprises several PL-frames, each of which comprising a base-band frame.

FIG. 1 illustrates an example scheme for transmit-receive scheduling, for an example set of parameters, wherein:

Forward link base-band frames are grouped into 2 mS long frames. Each frame is divided into four equal-length (0.5 mS long) sub-frames, each consisting of an integer number of e.g. DVB-S2 or DVB-S2X base-band frames. The satellite forward link carries four equal-rate streams (e.g. DVB-S2 or DVB-S2X), each occupying one sub-frame within a frame (for example, for a single-carrier-per-beam 500 Msps carrier, there will be four 125 Msps streams).

The terminal population is divided into four equal-size sub-populations. The division is done in a way that maximizes randomness across geography (and therefore within any single beam at any given time). Each sub-population of terminals receives the stream carried by one sub-frame within a frame. This division is fixed (i.e. a static division).

Framing increases the forward link delay by the duration of three sub-frames—1.5 mS in the example discussed above. Each sub-population (served by one of the four forward link sub-frames) may be further divided into groups. Each such group is served by a fraction of the sub-frame capacity, designated by a time-slice number (as defined for example by DVB-S2, Annex M) thereby representing the group. This makes it possible for a terminal to power down its receiver for the duration of a base-band frame as soon as it has determined that the frame's group (time-slice) number is not the one associated with the very same terminal.

There is an integer number of return link TDMA slots within the time period of a forward link sub-frame. A return link transmission time is allocated for a terminal during the three sub-frames within a frame, when it is not receiving communications. Return link capacity allocation takes into account satellite-terminal delay to ensure that capacity assignments (made in the satellite's return link time frame) are compatible with the terminal's transmit time window (as illustrated for example in FIG. 1).

Decreasing the frame duration reduces delay on one hand but also reduces the effectiveness of grouping on the other hand.

Increasing (or decreasing) the number n of sub-frames within a frame increases (or decreases) the transmit time window (to 1-1/n of a frame) and increases (or decreases) the delay somewhat (to 1-1/n of a frame).

Transmit-receive scheduling and return link capacity assignment are preferably signaled in layer 2. Their implementation in the satellite and the terminal is preferably managed by software.

The assignment of the terminal's sub-population and group is preferably carried out at the gateway. Each packet sent over the gateway-to-satellite link carries this data as side-information, thereby relieving the satellite from the task of storing mappings for the entire terminals' population.

Either the satellite or the gateway, allocate return link capacity. Upon session initiation (and preferably during hand-over), the terminal provides the satellite with the necessary information on its current location and sub-population assignment, and this data may then be cached at the satellite for the various active terminals.

Terminal Alerting

In order to save power, terminals that are not transmitting or receiving communications, enter preferably a stand-by mode in which all but a minimal set of their sub-systems, are powered down. An inactive terminal comes out of its stand-by mode when either (a) a packet arrives at its local interface; or (b) it is addressed by the satellite over the forward link; or (c) it has to perform an infrequent housekeeping task such as receiving updated system information. Out of these three cases, case (b) involves the following features of the air interface:

Each M—for example five—forward link frames will be grouped into a Super-frame (10 mS long for 5×2 mS frames). The start of a super-frame is signaled by the PLS.

Part of the PLS payload is dedicated to terminal alerting—signaling terminals that are currently in a stand-by mode that there is queued forward link traffic addressed to them, which will be transmitted within the next sub-frame. The terminal altering channel within the PLS may use time division multiplexing over a super-frame in a way that any single terminal only needs to demodulate a small number of (and with very high probability only one) base-band frame PL headers at a known offset within a known sub-frame in the super-frame. Thus, a terminal in a stand-by mode, will power up—once every 10 mS for the above example—the receiver blocks needed for demodulating one forward link base-band frame PL header (and very infrequently, a small number of subsequent headers), before returning to its stand-by mode.

A 10 mS super-frame introduces an average/worst-case delay in start-up of forward link traffic of 5/10 mS, respectively.

Return Link Burst Synchronization

As specified by the DVB-RCS2 ETSI standard, a master oscillator at the satellite generates the time base for the Network Clock Reference ("NCR"), used by the terminals to time their return link bursts. This oscillator is locked to the forward link symbol clock, and the frequencies are chosen so that the terminal can convert the timing of the start of a sub-frame to an NCR value. This makes it possible for a terminal that comes out of stand-by mode to re-acquire the NCR as soon as it has demodulated the first base-band frame header.

Satellite Tracking and Handover

Enabling Features

In order to make satellite tracking and handover as efficient and seamless as possible, the following is preferably carried out:

a. At installation, the terminal is programmed with its geo-location, with a high degree accuracy (for example within 50 m). The terminal is also coarsely 3-axis aligned (in North-South orientation and 2-axis tilt).

b. During commissioning, the terminal executes a calibration routine that fine-align its orientation and tilt, based on the satellite reception.

c. The satellites use GPS receivers or an equivalent gateway-referenced mechanism to establish a system-wide Time of Day (Toll) time base, and the gateways are configured to align themselves to the time base. The DVB-RCS2 NCR may serve for this purpose.

d. The satellites broadcast periodically over the forward link of each beam, Layer 2 information that specifies the system's satellite constellation—orbits and satellite positions—to an accuracy that would enable a terminal to predict the location of any satellite for a period such as up to 12 hours ahead, to within an accuracy of for example 100 m (300 nS one-way propagation time).

e. All gateways and terminals execute identical, bit accurate coverage mapping routines that use the information associated with (a) and (d) and timed by (c), in order to determine satellite coverage of a terminal.

Terminal's Antenna Tracking

Given sections (a) through (d) above, the terminal's antenna is able to track satellites without relying on signal strength indication. A terminal that has been in a stand-by mode for a pre-determined period of time, say 12 hours, activates itself for a period of time needed to receive up-to-date constellation information.

Coverage mapping routine (e) also provides the terminal with the satellite's Doppler frequency shift. The terminal may then use this information to:

Anticipate the resulting carrier frequency shift when acquiring and tracking the forward channel;

Correct the local NCR time-base;

Pre-correct the carrier frequency for return link bursts, so they would arrive at the satellite receiver with no shift.

Inter-Beam (Intra-Satellite) Switchover

All forward links generated by a satellite across all its beams may be synchronized at the symbol, base-band frame, sub-frame, frame and super-frame levels. Coverage mapping routine (e), executed by the terminal, determines the frame at which the terminal must switch beams. The terminal programs its receive synthesizer during the preceding transmit sub-frame and it is then able to acquire the first receive sub-frame (or, in a stand-by mode, receive the alert signal) over the new beam, with the same accuracy as while dwelling in the former beam.

Satellite and beam routing to a terminal is preferably determined by the gateway and signaled to the satellite through side-information attached to every forward link packet. The gateway, running the same coverage mapping routine (e) as the terminal, determines the timing of terminal beam switching and route forward link traffic accordingly. In order to minimize forward link queuing delay during a beam switch, either (a) the gateway is made aware of sub-framing when managing forward link queuing, or (b) the satellite is provided with data "expiration" information and prioritize traffic to terminals that are about to switch away from one of its beams.

With the exception of short and infrequent session initiating messages, return link transmissions from a terminal can only be made after a capacity request was sent to the satellite and a capacity assignment was made and received in response to the request made. The satellite responds to capacity request messages with a tightly controlled response time: the terminal receives the assignment a pre-defined number of sub-frames after it had made the request and—unless the return channel is heavily overloaded—the assignment will be for a (small) fixed number of sub-frames in the future.

In order to minimize interruption to traffic to and from terminals during a beam switch, forward- and return-link switching use the procedure illustrated in the following FIG. 2.

Figure 2:
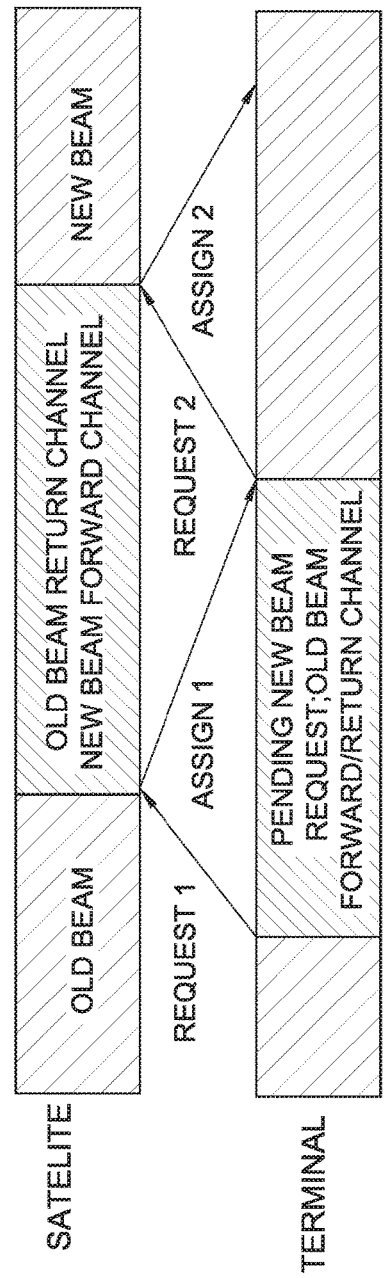
FIG. 2 the satellite accepts requests for capacity in the new beam that are received over the old beam.

As may be seen in FIG. 2 the satellite accepts requests for capacity allocation for the new beam that are received over the old beam. When anticipating a beam switchover, the terminal makes—over the old beam—a request for capacity allocation in the new beam, at such time that the assignment is received just prior the switchover (Request 1 in FIG. 2). There will only be at most one other such request pending from a given terminal. While the request is pending, the terminal continues to receive forward link and transmit (as was previously assigned) return link traffic over the old beam.

The gateway re-routes traffic to the new beam at the time it should start arriving at the terminal, immediately following the switchover. There will be a transition phase (approximately coinciding with the time the cross-beam capacity request is pending) when the satellite receives the terminal's traffic over the old beam and transmits traffic to the very same terminal over the new beam.

At the switchover, the terminal re-programs its transmit and receive LO frequency synthesizers during the receive and transmit sub-frames, respectively.

Preferably, inter-beam (intra-satellite) beam switching does not in itself involve any air interface messaging.

Beam selection and switching decisions are made by the gateway and the terminal: the satellite does not have to track the switchover process.

Inter-Satellite Switchover

As explained hereinabove, all the satellites in the system are preferably synchronized to a common ToD. Their forward links are synchronized at the base-band frame, sub-frame, frame and super-frame levels, and their return links have synchronized slots.

The coverage mapping routine executed at the terminal determines the timing of the satellite switchover. A terminal in a stand-by mode uses this information to switch to the new satellite and then proceeds to demodulate its terminal alert channel.

Forward link traffic to an active terminal that is switching satellites is re-routed by the gateway to the new satellite. The gateway executes the same coverage-mapping algorithm as the terminal and will time the re-routing in advance so that, after propagating through the system, the forward link traffic arrives at the terminal aligned in time with the switchover without experiencing any switchover-related queuing delay.

In order to perform a return link switchover, the terminal sends, ahead of the switchover moment, a special capacity request message that is forwarded by the old (switched-from) satellite to the new (switched-to) satellite. This message is either carried over an Inter-Satellite Link ("ISL"), if one extends between the two satellites, or goes through the gateway(s) serving them. The capacity request specifies the time of switchover, allowing the new satellite to allocate the required capacity accordingly. The terminal will time this request message to allow enough time for an assignment response to arrive back through the old satellite before implementing a switchover. The terminal is then able to switch the return link transmission from the old to the new satellite with only a small hit in throughput.

The terminal re-programs its transmit and receive LO frequency synthesizers during the receive and transmit sub-frames respectively, immediately preceding the switchover, and steers its antenna from the old satellite to the new satellite during the back-end part of the transmit sub-frame immediately preceding switchover. This reduces by a small amount the return link transmit time window within the last frame before the switchover takes place. In addition, any difference in terminal-satellite path delay between the old and the new satellite will cause a shift in the frame, changing the duration of the first transmit window following the switchover.

The coverage-mapping routine preferably provides the carrier-frequency Doppler shift of the new satellite.

There will be, immediately after switchover, a larger uncertainty in timing of the received forward channel than during beam dwell. A larger search window will therefore be needed for the first sub-frame or (for a terminal being in a stand-by mode) alert channel access. At the same time, assuming the enabling features discussed above, this window will be much shorter than one forward link base-band frame, creating no ambiguity in the PL header to be demodulated.

First-time return link transmissions arrive at the new satellite with a larger timing error than the follow-on traffic (500 nS, for the example parameters given above, or 1% of 50 µS for a relatively short 1024 bit burst at 20 Mbps). To optimize the return link guard interval, so that it is not affected by the constraints of this tiny fraction of traffic, return link capacity assigned through the procedure described above will leave entire slots as guard time intervals and, if needed, the satellite's return link receiver(s) will be alerted to perform burst acquisition over a larger search window.

Figure 3A:
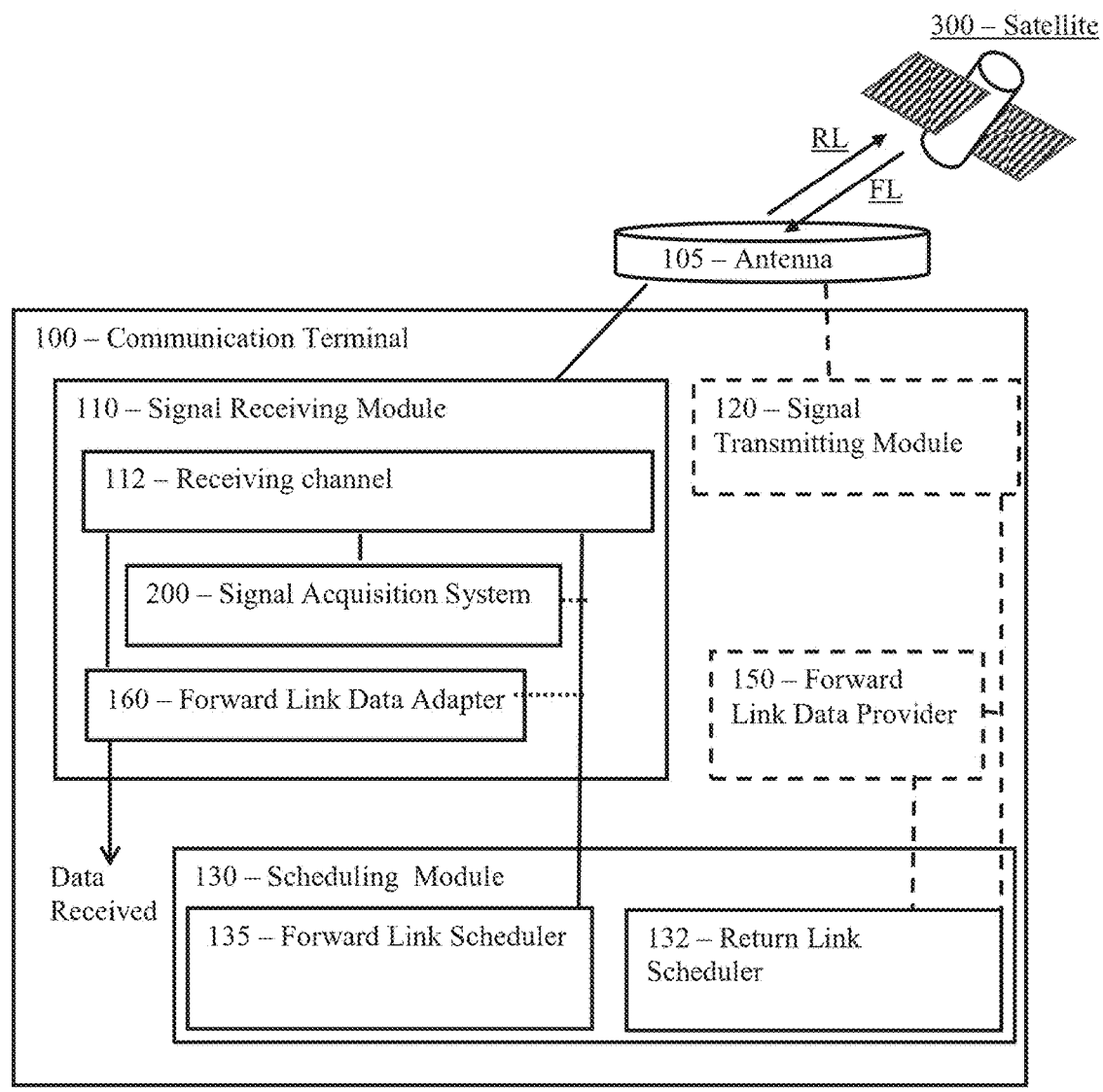
FIG. 3A is a block diagram of a communication terminal (e.g. satellite communication terminal) according to an embodiment of the present invention.

Reference is made to FIG. 3A showing a block diagram of a communication terminal 100 (e.g. satellite communication terminal) according to an embodiment of the present invention. The communication terminal 100 is configured and operable for wirelessly communicating, directly or indirectly, with a designated data gate-way station (not specifically shown) for exchanging data therewith view a forward-link communication channel FL by which data is received by the terminal 100, and a returned-link communication channel RL by which data is transmitted from the terminal 100. In the present non-limiting example, the communication terminal 100 is a satellite communication terminal which is configured and operable for communicating indirectly with the data gateway via a communication mediator being presented here for example as satellite 300. Namely in this example the communication terminal is configured and operable for establishing the forward and return communication channels FL and RL with the communication mediator 300 (which is hereafter for clarity and without loss of generality referred to as satellite 300).

In the present example, the communication mediator 300 is configured and operable for making efficient use of its communication resources (data bandwidth/rate). This is achieved according to some embodiments of the present invention by dividing the forward link communication frame (data frames) transmitted by the mediator/satellite into a plurality of sub-frames. Namely each or one or more communication frame in the forward link includes sub-frames that are transmitted in the forward link from the satellite/mediator/gateway 300. In turn, the communication terminal 100 is associated (e.g. registered in or belongs to) a certain group of one or more respective groups of communication terminals. For example a plurality of satellite terminals are divided in several groups). In order to efficiently exploit the forward link bandwidth/rate, each of the designated communication sub-frames of the complete communication frame is designated to specific one (or more) of the terminal groups. In other words the communication frame includes a certain designated sub-frame (being a respective portion of the full communication frame) which is specifically designated to be received by the terminal 100 (and possibly by additional member terminals of the group to which terminal 100 belongs). Accordingly the full communication frame in the forward link may include a plurality of N communication sub-frames designated to serve respective one or more groups of (satellite) communication terminals.

Accordingly the communication terminal 100 of the present invention includes a scheduling module 130 that is configured and operable for determining the time slot (e.g., the timing and duration within the forward link communication frame that is transmitted by the satellite/mediator 300) of the designated communication sub-frame which is designated to be received by the specific terminal 100 (and/or by other members of his terminal group). The Signal Acquisition module 200 detects and locates the start of the reception frame, as described below. This detection and location enables the receiver to process and decode the data. Some of the received data may contain time stamp information, which is an indication of the frame transmission time as measured by the network clock located at the gateway. This information, also known as Network Clock Reference is standardized. Based on this time stamp information the scheduling module 130 schedules the transmission time slot according to the transmission plan conveyed to it by the gateway. In some embodiments, the timeslot of the designated sub-frame is a data parameter (e.g. configuration parameter) that is stored in a configuration memory section of the terminal 100.

In some embodiments the scheduling module 130 includes a forward link scheduler module 135 that is configured and operable for utilizing said time slot data and assign a forward link schedule for receiving the designated communication sub-frame at said time slot. In some implementations the forward link scheduler module 135 generates operative instructions/signals for activating the signal receiver module 110 of the terminal 100 for receiving the designated sub-frame during the respective time slot at which it should be communicated over the forward link communication channel.

In some embodiments the scheduling module 130 also includes a return link scheduler 132 that is configured and operable for assigning a return link schedule for transmitting information to the satellite during time slots other than the time slot of the designated communication sub-frame. For examples the return link scheduler 132 may be configured an operable for generating operative instructions/signals for activating the signal transmitting module 120 of the terminal 100 for transmitting return link data during one or more time slots at which the forward link is occupied by sub-frames that are designated to other terminals/terminal-groups.

Accordingly optionally the terminal 100 includes a signal transmitting module 120 and also optionally a return link data provider module 150 connectable to the scheduling module 130 and configured and operable to be responsive to operative instructions therefrom for performing signal transmit operations for transmitting return link data during the return link schedule. The return link data provider module 150 may be configured and operable to prepare and provide the return link data that should be transmitted to the satellite and the signal transmitting module 120, may be configured and operable for encoding the returned link data on a signal to be transmitted (e.g. by properly modulating the signal to be transmitted according to a certain modulation scheme associated with a predetermined data transmission protocol) and thereby generate the transmitted signal that is to be transmitted by the antenna 105. A person of ordinary skill in the art will readily appreciate how to appropriately configure signal transmitting module 120 and/or a return link data provider module 150 for generating transmission signals according to a predetermined protocol.

In some implementations the forward link scheduler module 135 is configured and operable for generating operative instructions/signals for deactivating the signal receiver module 110 of the terminal 100 during one or more time slots at which the forward link is occupied by sub-frames that are designated to other terminals/terminal-groups. Also, additionally or alternatively, in some implementations the return link scheduler module 132 is configured and operable for generating operative instructions/signals for deactivating the signal transmitted module 110 of the terminal 100 during the respective time slot at which it the designated sub-frame is communicated over the forward link communication channel. This provides for reducing/suppressing noise and/or crosstalk between the received forward link signal and the transmitted return link signals and therefore improves the signal to noise ratio—thereby enabling improvement in the communication data rate of the system.

Accordingly the terminal 100 may include a signal receiving module 110 connectable to the scheduling module 130 and configured and operable to be responsive to operative instructions therefrom for performing signal receipt operation during the forward link schedule (namely during the time slot of the designated sub-frame). This signal receiving module 110 thereby receives and processes the designated sub-frame designated to the terminal 100 at the correct time slot of the communication frame transmitted in the forward link.

Typically the signal receiver 110 may include a receiving channel (not specifically shown in FIG. 3A) configured and operable for applying preprocessing to the analogue signal received from the antenna 105 associated with the terminal. For example the receiving channel may include any one or more of the following modules, which may be implemented as analogue and/or digital modules: signal mixers and/or down-converters (e.g. for applying frequency shift/transform to the signal, such as reducing the signal frequency to the baseband) and/or bandpath filters (e.g. matched filter, for applying bandpass filtration to the received signal) and/or Analogue to Digital converter(s)/samplers (for Sampling the analogue signal from the antenna 105 to convert it to digital form, and/or 11Q signal converters (for processing the received signal to the complex I/Q signal representation form), and/or phased locking loops (PLLs) for maintaining synchronization with the phase of the received signal; and or other modules. In this connection, a person of ordinary skill in the art will readily appreciate how to configured and receiving channel for particular requirements and/or characteristics of the terminal and/or the physical layer parameters of the forward link channel.

The signal receiver 110 may also include a Forward Link Data Adapter 160, adapted for receiving the received signal (e.g. after its preprocessing by the receiving channel) and extracting forward link data therefrom. More specifically, the Forward Link Data Adapter 160 may be configured and operable for implementing a certain communication protocol (e.g. DVB-S2 or DVB-S2X) and may be configured and operable for processing the received designated sub-frames, which are designated to the terminal 100, in order to determine, in accordance with such protocol, the header segments and data segments of the designated sub-frames and extract the data therefrom accordingly. A person of ordinary skill in the art will readily appreciate of to implement the Forward Link Data Adapter 160 for a given communication protocol.

Figure 3B:
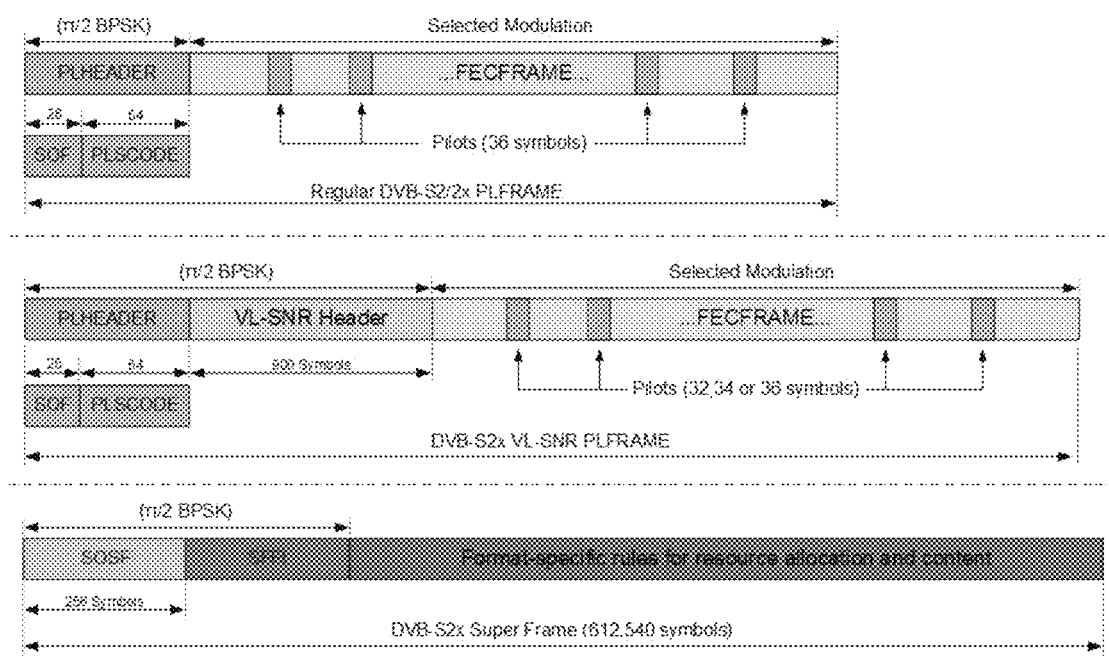
FIG. 3B is a diagram schematically illustrating three possible frame structures of the DVB-S2X standard/protocol.

For example reference is made to FIG. 3B which is diagram schematically illustrating in self-explanatory manner three possible frame structures of the DVB-S2X standard/protocol. In this example three frame types are illustrated: A regular frame, a very low signal-to-noise ratio noise frame (referred to as VL-SNR frame), and super frame. The code words (e.g. unique words referenced UW in FIGS. 4B and 4C below) used in the frames may include as follows:
  A start of frame (SOF) which is a 26 symbols sequence.
  A complete header, 90 to 180 symbols which contain an encoding of some frame information. If this information is pre-configured or otherwise know to the receiver, it may serve as a UW.
  A VL-SNR frame of the DVB-S2X protocol may include code word (UW) in the form of a VL-SNR header which contains 900 symbols (there could be different sequences of this code word).
  A super frame of the DVB-S2X protocol may include SOSF (Start Of Super-frame) code word (UW) in which contains 270 symbols (there could be different sequences of this code word).

Turning back to FIG. 3A, as indicated above, in some implementations of the present invention the scheduler module 130 is configured and operable for activating the receiver module 110 at time slots at which the designated sub-frame should be received by the terminal and deactivating the receiver module 100 at other time slots (e.g. for instance in order to reduce cross-talk between the receipt/transmit channels and/or reduce other noises and/or save energy). To this end in some implementations the terminal 100 is configured such that the signal transmitting module 120 and the signal receiving module 110 thereof are configured for operating at mutually exclusive time slots for transmitting and receiving the respective return and forward link signals.

However, in such cases/implementations the carrier frequency locking module(s) of the signal receiving module 110 is/are not activated during return link schedule, thereby allowing a carrier frequency of said forward link to drift out of tune. Even more specifically, in implementations of the system, in which the receiver may be deactivated for relatively long periods of time (e.g. sleep periods or beam hopping scenarios when the satellite transmits its energy to different areas (cells) at different times), there may occur a signal loss (e.g. phase synchronization loss) between the forward link signal and the receiver. This is because in cases where the receiver is deactivated, phase synchronization mechanisms of the receiver, such as a phase lock loop, and/or other frequency tracking mechanisms implemented digitally) may be deactivated/inoperative as well. Accordingly, in cases the forward link signal drifts significantly, and/or in case the synchronization signal (clock signal) of the receiver 110, drifts, upon activation of the receiver it might not immediately lock/find the forwards link signal. This is because such a drift may cause a discrepancy between the carrier frequency at to which the receiver is tuned and the actual carrier frequency over which data is encoded on the forward link signal. Indeed, this may be overcome by applying sequential carrier frequency scanning immediately after activation the receiver 110, by sequentially tuning the receiver to different carrier frequencies in an attempt to identify the correct carrier frequency about which the forward link signal data is encoded.

However, such sequential carrier frequency scanning is time consuming operation (particularly in cases where the communication frames carry large data payloads—since it the duration of a complete communication frame is required at each such scanning step in order to identify the header of the frame).

Therefore, according to some embodiments of the present invention the communication terminal 100 (e.g. the signal receiving module 110 thereof) includes a novel signal acquisition system 200, which is configured and operable for processing time frame of the received (forward link) signal (e.g. which time frame may be of the length of one or more predetermined code words expected in the designated communication sub-frame of the forward link) to simultaneously, at the same time/processing-stage/step, determine whether such code words are encoded in the processed time frame of the received signal over any one of a plurality of possible carrier frequencies (to which the received signal may have drifted relative to the receiver's reference carrier frequency). Accordingly, the signal acquisition system 200 of the present invention enables simultaneous locking on the carrier frequency of the forward link signal and therefore facilitates fast acquisition of the signal.

Thus in terminal 100 the signal acquisition system 200 is configured for operating upon activation of the receiver for process at least a part of the communication frame received in the forward link (e.g. from the satellite/mediator 300) to lock on to the forward link signal (e.g. on to the exact frequency thereof). This allows to immediately (with no delays) identify at least one code word in the received signal designating whether the received signals encompasses a designated sub-frame of interest, and determine a time index (sample position) at which said code word is encoded in the received signal (namely determining the initial/reference time/sample of the sub-frame of interest in the received signal and the carrier frequency over which data (e.g. code word) is encoded in the received signal.

In some implementations the communication terminal 100 of the present invention configured as described above is configured to implement efficient beam hopping technologies. This is because, the signal acquisition system 200 described above enables efficient real time locking on the carrier frequencies of unknown/newly received signals, thereby allowing the satellite beam to hope from one group of terminal to the other, and cause discontinuity in the forward link of each terminal, while without the cost of time consuming signal acquisition (carrier frequency locking) at the times of reestablishment of the forward link signals to a particular terminal.

In this connection, in some implementations the scheduling module 130 is further configured and operable for generating a request for allocation of return link capacity in another beam or a different satellite, thereby when a terminal switches a beam or a satellite, it is able to immediately utilize the allocated capacity over the new (switched-to) beam or at the new satellite.

Figure 4A:
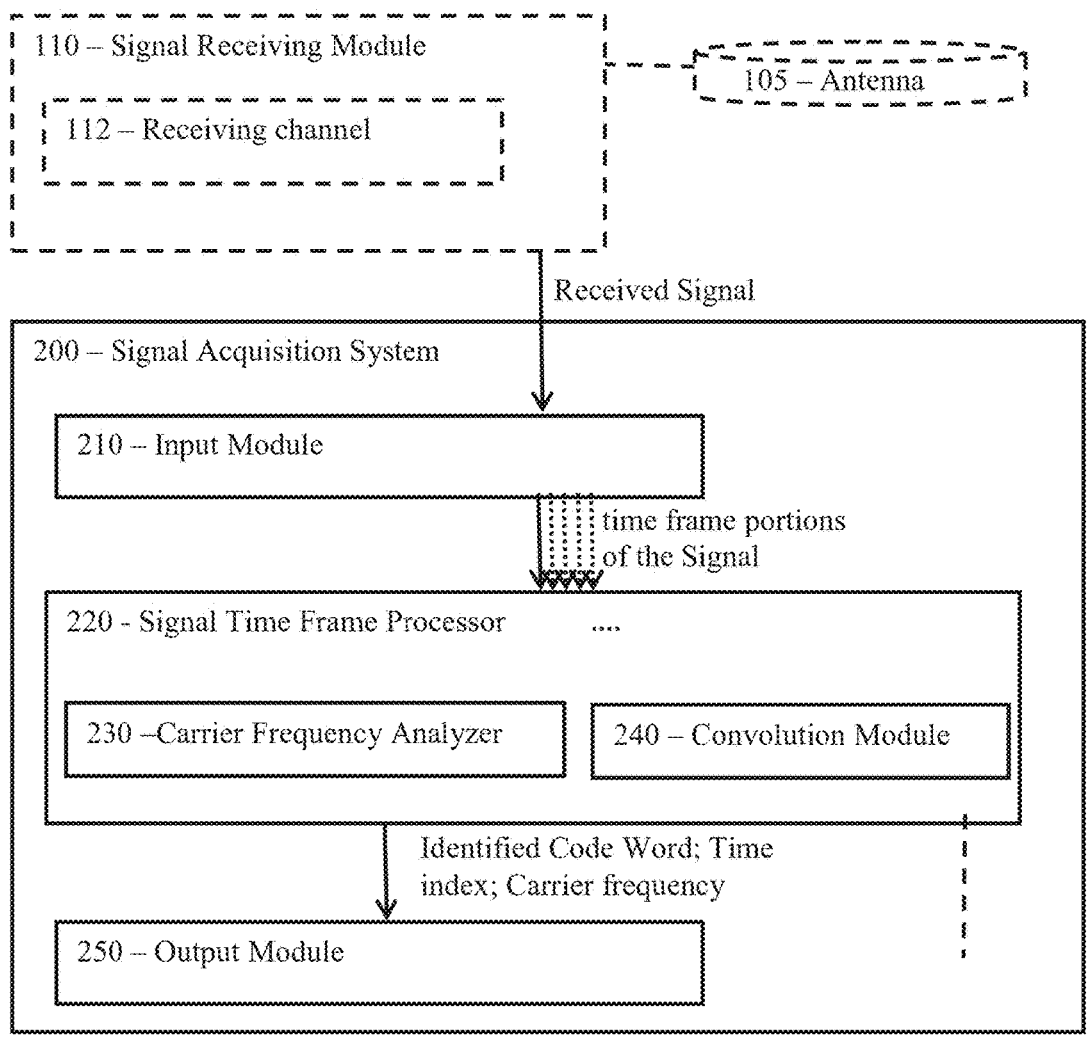
FIGS. 4A to 4C are block diagrams of several examples of signal acquisition system according to various embodiments of the present invention.
Figure 4B:
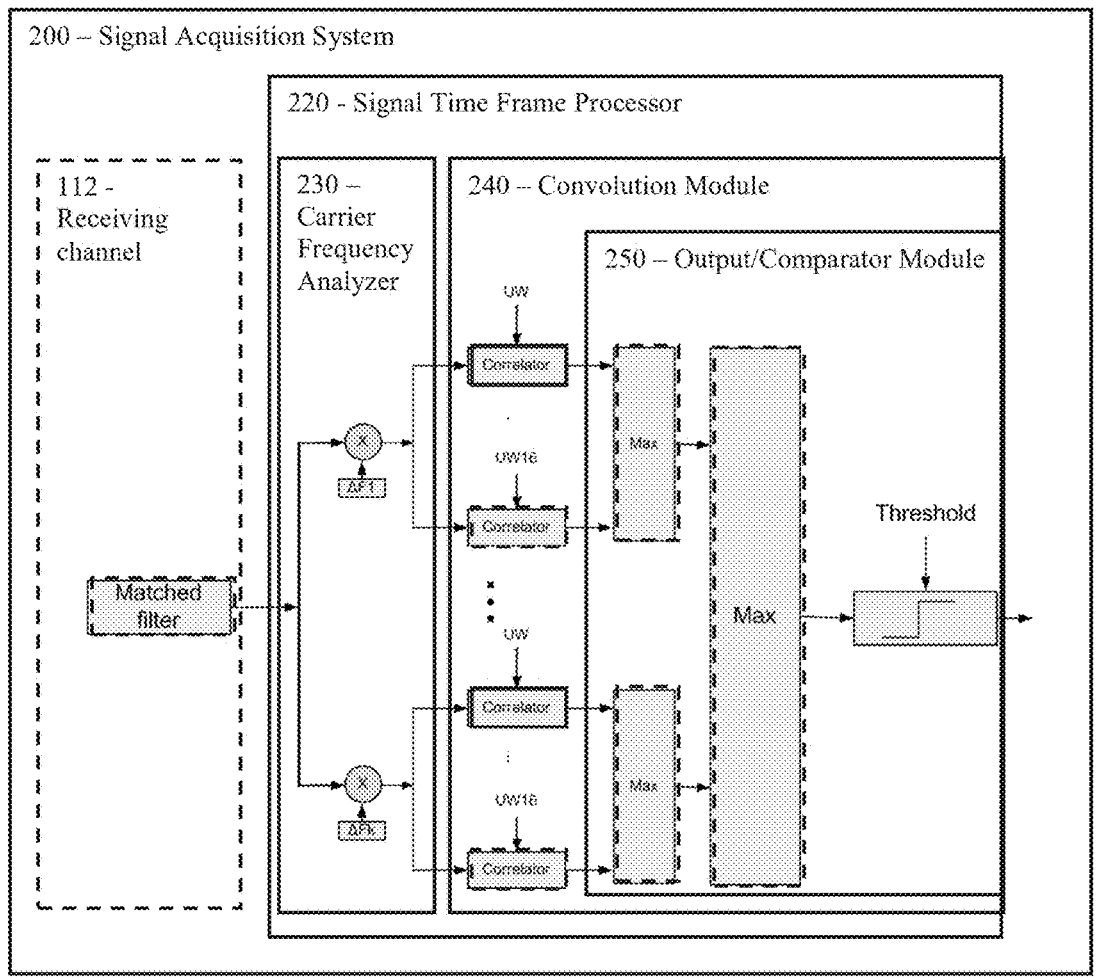
Figure 4C:
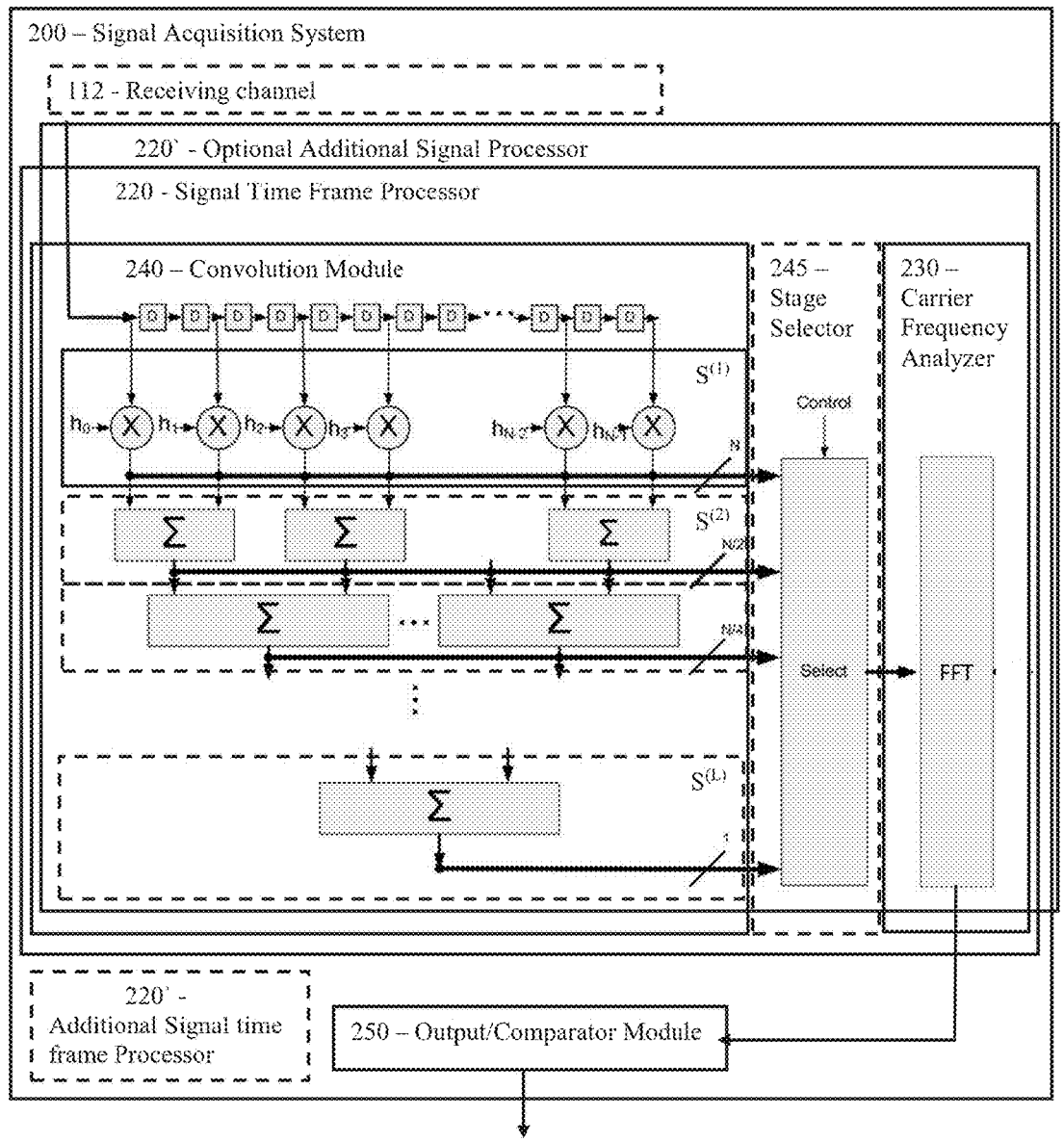

Turning now together to FIGS. 4A to 4C, there are illustrated in block diagrams several examples of signal acquisition system 200 according to various embodiments of the present invention.

The signal acquisition system 200 according to certain embodiments of the present invention includes:
  an input module 210 configured and operable to obtain a received signal (e.g. electro-magnetic (EM), typically radio frequency (RF), signal) which encodes communicated data over a certain carrier frequency;
  a signal time frame processor 220 that is connectable to the input module and configured and operable for continuous processing (e.g. in real time) of time frame portions of the received signal to identify at least one code word of a group of one or more predetermined code words, being encoded in a time frame portion of the received signal; and
  an output module configured and operable for outputting identification data indicative of identification of said code word in the signal.

The acquisition engine/system 200 is a part of the receiver 110, the purpose of which is to acquire the received signal, namely detect the existence of a received signal and synchronize to the basic frame structure. The receiver might to acquire the received signal in two, rather different circumstances:
  Cold start, wherein the terminal needs to acquire the satellite signal without any prior information. Synchronization procedures mainly include carrier frequency correction, sampling timing correction, frame synchronization, equalization and fine phase correction.
  Signal loss, wherein the signal is lost for a short period. In this case, most of the parameters are available, and after reception is resumed, full acquisition can be readily achieved.

It can be quite safely assumed that the burst receiving conditions are more of the signal loss type rather than cold start, but, depending on the off-time interval, oscillator's drift and instability and dynamic changes may require that the receiver performs re-acquisition.

The acquisition engine/system 200 is designed to achieve recovery from a signal loss with in a single transmission frame. Possible applications may include: operation as a terminal receiver in a Frame by frame beam-hopping environment, and operation when dummy frames are omitted hence the resulting transmission is discontinuous.

In some cases, particularly after long durations in which the receiver is not locked to the signals which is to be received, the actually carrier frequency of the signal to be received may be unknown at the receiver end (e.g. due to frequency drift) and may actually reside anywhere within a certain, e.g. predetermined, frequency band in which frequency shift due to drifting can occur. To this end the actual carrier frequency can at any one of a plurality of possible carrier frequencies within this frequency band.

Therefore, according to some embodiments of the present invention the signal time frame processor 220 is adapted to overcome this problem of the carrier frequency drifting, and configured and operable for applying real time processing of the received signal to identify in real time the whether any one or more code words are encoded in the received signal over any of the possible one or more carrier frequencies.

To this end, in some embodiment, the signal time frame processor 220 includes a carrier frequency analyzer module 230 configured and operable for analyzing a time frame portion (or one or more time frame portions) of the received signal in conjunction, simultaneously, with the plurality of possible carrier frequencies of the received signal. More specifically the carrier frequency analyzer module 230 is configured and operable for transforming the time frame portion of the received signal to generate (simultaneously) carrier-data which includes a plurality of carrier-data-pieces associated with each possible carrier frequency of the plurality of possible carrier frequencies of the received signal, respectively. The transform is carried out such that each of the carrier-data pieces are indicative of data is decoded from the processed time frame portion by in case such a decoding was made by assuming one of the possible carrier frequencies the received signal might have had acquired. In other words, each carrier-data piece is indicative of a "pseudo" data (meaningful or not) encoded in the time frame portion over certain assumed one of the possible carrier frequencies associated with said carrier-data piece.

For instance, as will be described in more details below, in the embodiments of FIG. 4B, the carrier frequency analyzer module 230 includes an array of signal frequency transformers, (e.g. implemented as digital or analogue signal mixers and/or frequency-shifters) $\Delta f_1 \ldots \Delta f_n$ which are configured and operable for applying difference respective frequency shifts $\Delta f_1$-$\Delta f_n$ to the time frame portion of the received signal thereby respectively generate n carrier-data pieces associated with differently frequency shifts of the received signal. Even more specifically, these simultaneously generated carrier-data pieces are actually frequency shifted replicas of the processed time frame portion of the received signal having their carrier frequencies shifted by the different predetermined frequency shifts $\Delta f_1$-$\Delta f_n$ respectively relative to the certain undetermined/unknown carrier frequency of the received signal. Accordingly in this case each carrier-data piece is indicative of a "pseudo" data (meaningful or not) encoded in the time frame portion over certain assumed one of the possible carrier frequencies associated with said carrier-data piece.

In another example of FIG. 4C, the carrier frequency analyzer module 230 includes a time to frequency transformation module, which transforms the convolution results of the time frame portion of the received signal with a certain code word which might have being encoded in the signal, and transforms these convolution results from the time domain to the frequency domain. The time to frequency transformation may be implemented for example using Fourier transform (e.g. Fast Fourier Transform (FFT) and/or Discrete Fourier Transform (DFT)) and/or via any suitable time-frequency transform. Accordingly, a result of the transform is generally a series of bins in the frequency domain. In this case, (transforming the convolved time frame portion of the signal with the code word), the bins actually present carrier-data pieces whereby the intensity (magnitude) of each bin number is indicative of whether the specific code word used in the convolution is encoded in the time frame portion of the signal under the assumption of a certain one of the possible carrier frequencies (or in other words under the assumption that the received signal is shifted by one of the frequency shifts $\Delta f_1$-$\Delta f_n$ associated with the particular bin. To this end, the bins together present a plurality of carrier-data pieces indicative of the plurality of possible frequency shifts of the carrier frequency of the received signal.

In some embodiment, the signal time frame processor 220 also includes a convolution module 240 configured and operable for processing the time frame portion of the signal to simultaneously identify whether the time frame portion encodes the at least one code word, over any one of the a plurality of possible carrier frequencies simultaneously.

In this connection, as shown for example in the embodiment of FIG. 4B, the convolution module 240 includes a plurality of at least n correlator modules connectable/connected to the plurality of n signal mixers (frequency-transformers/shifter; e.g. to their output) and respectively configured and operable for simultaneously convolving the n plurality of n carrier-data pieces (e.g. which are in this case constituted by respectively differently frequency shifted signal portions) with a certain code word (or possibly with a plurality of m code words). Accordingly in this case the n correlator modules of convolution module 240 in FIG. 4B generate simultaneously n convolved signal representations whereby each convolved signal representation is indicative of whether the convolved code word is encoded in the time frame portion of the signal with a certain corresponding one of the carrier frequency shifts $\Delta f_1$-$\Delta f_n$.

In another embodiment, that illustrated in FIG. 4C, the wherein the convolution module 240 precedes the frequency analyzer module 230 with reference to the direction of the signal processing flow by the system. In this case the convolution module 240 is a word convolution module which is adapted to convolve (during a first and optionally only convolution stage) $k^{(1)}$=n successive (typically equal sized) segments of the time-frame portion of the signal, with corresponding successive symbols/constituents of the code word (e.g. each symbol may be constituted by one or more bits of the code word). This yields an order series of n respective symbol-convolved signal representations (which correspond to timely ordered segments in the received signal), whereby each symbol-convolved signal representation indicates of whether a respective symbol/constituent is encoded in the time-frame portion. Then, by implementing the time-to-frequency transformation of the order series of n respective symbol-convolved representations, a frequency representation of the code word convolution with the time frame portion of the received signal is obtained. The frequency representation actually presents carrier data and includes a plurality of bins presenting carrier data portions indicating whether the code word and at which carrier frequency the code word is encoded in the time frame portion of the received signal. More specifically, the intensity of each bin numbers indicates whether the code word is actually encoded in the time frame portion of the received signal and a particular carrier frequency associated with the location of the bin in the frequency representation. In other words by comparing the bins with certain threshold, and detecting a bin exceeding the threshold, the carrier frequency of the received signal can be determined from the bin location in the frequency representation and the code word is identified as encoded over that carrier frequency in the respective time frame portion of the received signal.

To this end, the time frame processor 220 is adapted to determine a time index of code word in the received signal, based on the time frame portion of the received signal at which the code word is identified. Accordingly the output module may be further adapted to output this time index data, as this time index data actually designates/indicate a reference/initial location of a communicating data frame communicated over the received/forward link signal.

Also, the time frame processor 220 is adapted to process carrier data to identify the carrier-data piece which encodes significant data and thereby determines the carrier frequency of the received signal. The output module 250 is further adapted to output said determined carrier frequency.

Referring specifically to FIG. 4B, as indicated above, in this embodiment, the carrier frequency analyzer module 230 of the signal acquisition system includes a plurality of n signal mixers/shifters (transformers) $\Delta f_1$-$\Delta f_n$ configured an operable for simultaneously processing the received signal. To this end, the signal mixers are adapted to apply a plurality of n respectively different predetermined frequency shifts to the received signals and thereby generate a plurality of n respectively different frequency shifted signals having their carrier frequencies shifted by said different predetermined frequency shifts relative to the certain undetermined carrier frequency of the received signal. The convolution module 240 includes a plurality of at least n correlator modules connectable to the plurality of n signal mixers $\Delta f_1$-$\Delta f_n$ respectively and configured and operable for simultaneously convolving the plurality of frequency shifted signals respectively with the code word, to thereby concurrently generate n convolved signal representations indicative of whether the code words is encoded in said the corresponding frequency shifted signals.

FIG. 4B depicts, in a self-explanatory manner, the operational principles of the signal acquisition system 200. It relies on a priori known information (UW—Unique/code Word) transmitted by the transmitter within the transmitter frame. The received signal at the output of the optionally provided matched filter of the receiving path, is frequency shifted and then correlated with several possible unique/code words UW. In some examples, the output/comparator module 250 is used to determine the start of frame based on the convolved signal representations (representing the correlations with the frequency shifts). To this end, the maximal absolute value of the correlation among all possible frequency shifts is tested and compared to a threshold value, and the timing when this threshold is passed determines the start of frame (time index).

According to some embodiment, the convolution module 240 includes a plurality of at least n×m correlator modules, for simultaneously testing whether any one of number m (integer) of code words UW is encoded in the received signal (in the time frame portion thereof). To this end, each group of in correlator modules is connectable to a respective one signal mixer of the n signal mixers $\Delta f_1$-$\Delta f_n$ and configured for simultaneously convolving a respective frequency shifted signal obtained by the respective one signal mixer with up to in code words simultaneously. The convolution module thus generates up to n×m convolved signal representations indicative of whether any one of the m code words is encoded in any one of the n frequency shifted signals respectively.

Accordingly in such embodiments the output module may include a code word identification module a comparison module adapted for comparing n×m convolved signal representations with a predetermined criteria and thereby to determine whether any code word is encoded in the frequency shifted signal corresponding to the convolved signal representation.

Turning now to FIG. 4C, the construction and operation of the signal acquisition system 200 are more specifically described. In this example, the convolution module 240 is implemented as a word convolution module and includes a plurality of $k^{(1)}$=n delay modules D configured and operable for applying $k^{(1)}$ different time delays to the received signal and thereby generate $k^{(1)}$ respective time delayed signals which are copies of the received signal (time frame portion thereof) delayed by the $k^{(1)}$ respective time delays. The convolution module 240 also includes at least a first word convolution stage $S^{(1)}$ which includes: a code word provision module, which is not specifically shown and can be implanted digitally as a shift registers connected to a memory storing the predetermined code word UW, and which is adapted to provide $k^{(1)}$ data portions $h_0$ to $h_{n-1}$ indicative of n symbol constituents of the code word ($k^{(1)}$=n). The first word convolution stage SW further includes a plurality of $k^{(1)}$ symbol convolution modules (e.g. signal multipliers). Each symbol convolution module is connectable to a respective delay module of the plurality of delay modules, for receiving therefrom a corresponding time delayed signal, which is generated thereby, and is connectable to the code word provision module (shift register) for receiving corresponding symbol/constituent $h_i$ of the $k^{(1)}$ symbol constituents whose location in the code word UW corresponds to the respective time delay of the time delayed signal of the respective delay module D. Also, each symbol convolution module is configured and operable for convolving the time delayed signal with the corresponding symbol/constituent to generate a respective symbol-convolved signal representations indicative of whether said symbol constituent is encoded in the corresponding time delayed signal. Thus, the $k^{(1)}$ symbol convolution modules generate $k^{(1)}$ symbol-convolved signal representations indicative of whether the $k^{(1)}$ symbol constituents of the code word are encoded in a timely order in the received signal. To this end, the first stage $S^{(1)}$ yields n symbol-convolved signal representations.

The signal acquisition system 200 also includes the carrier frequency analyzer module 230 including a time to frequency transformation module (e.g. FFT or DFT) adapted for receiving the $k^{(1)}$ symbol-convolved signal representations from the code word convolution module 240 and applying time to frequency transformation thereto to obtain a frequency based representation of the n symbol-convolved signal representations.

In mathematical terms, the operation can be described as follows:

Denote the input signal (complex I/Q) as $s_n$ where n is the symbol number, where, without loss of generality, we can take n=0 as the first symbol in a frame (time frame portion).

For the code word UW sequence, the input signal can be described as:

$$s_{n+n_0} = h_n e^{j2\pi \tilde{f}(n+n_0)T_s}, n=0, \ldots, N-1$$

where $h_n$ is the known symbol value of the UW, N is the number of symbols within the UW. $\tilde{f}$ is the frequency error (in Hz) between the received signal and the receiver oscillator. $T_s$ is the symbol time (1/Symbol rate) in seconds, $n_0$ is the actual delay of the received signal.

The operation performed by the acquisition module is then:

$$[n_0, k_o] = \max_n \max_k \left\{ \sum_{m=0}^{N-1} h_m^* s_{m-n} e^{-j2\pi m T_s \Delta f_k} \right\} = \quad (1)$$

$$\max_n \max_k \left| \sum_{m=0}^{N-1} h_m^* h_{m-n+n_0} e^{-j2\pi m T_s (\Delta f_k - \tilde{f})} \right|$$

Namely the input signal is corrected by a frequency shift $\Delta f_k$ and then correlated with the UW. If the frequency $\Delta f_{k_0}$ shift equals that of the actual error, the result is the actual correlation between the received signal and the UW, which will peak at $n_0$.

In a specific example of the implementation, if we take $$\Delta f_k = \frac{k}{NT_s}$$

Eq. (1) can be written as:

$$[n_0, k_o] = \max_n \max_k \left\{ \sum_{m=0}^{N-1} h_m^* s_{m-n} e^{-j2\pi m T_s \frac{k}{NT_s}} \right\} = \max_n \max_k \left| \sum_{m=0}^{N-1} h_m^* h_{m-n+n_0} e^{-j2\pi \left(\frac{mk}{N} - \tilde{f}\right)} \right|$$

which is the FFT operation, performed over the terms $h_m^* s_{m-n}$.

The actual implementation is exemplified in FIG. 4C, in which the correlation to a given UW (of which the symbols are described as $h_i$) is performed first, and the hypotheses of the possible frequencies of the carrier signal are tested via DFT/FFT.

According to some embodiment, the signal acquisition system 200 is configured to be scalable to complexity. This can be achieved by configuring the word convolution module 240 with a cascade of convolution stage including the first convolution stage $S^{(1)}$ described above and one or more cascaded additional convolution stages $S^{(2)}$ to $^{(L)}$ where each of the additional convolution stages l, $S^{(l)}$, is adapted for receiving the $k^{(l-1)}$ symbol-convolved signal representations from the preceding convolution stage $S^{(l-1)}$ and aggregating (adding, summing) them to generate a set having a lower number of $k^{(L)} = k^{(L-1)}/N$ symbol-convolved signal representation pertaining to larger symbols of the code word. Also, in this embodiment, a selector module 245 is optionally used which is configured to selectively operate the time to frequency transformation module FFT based on the symbol-convolved signal representations obtained from a selected stage l of the set of stages. Accordingly, the frequency transformation module FFT transforms solely the $k^{(1)}$ symbol-convolved of the selected one of the convolution stages thereby enabling controllable adjustment of processing power requirements and accuracy of identification of the code word in the received signal.

Hence, for a high symbol rate, for which a given offset is translated into a small error relative to the symbol rate (and thus lower frequency resolution is required), averaging is performed over a large number of coefficients and the size (number of bins) of the FFT is smaller. This enables faster calculation. On the other hand, for lower symbol rates, where resources are available, full FFT can be performed, with high resolution.

In this regards, it should be understood that a peak in the frequency based representation (the output of the FFT/DFT) satisfying a predetermined criteria (threshold) indicates that the code word UW is encoded in the received signal. The location of the peak in the frequency based representation indicates a shift of the carrier frequency of the received signal; and the intensity (absolute magnitude) of this peak indicates significance level of the code word being encoded in the received signal (in the processed time frame portion thereof). Therefore, in some embodiment, the output module comprises a code word identification module may include a comparison module adapted for comparing said the peak intensity with a predetermined criteria and thereby determine whether the code word is encoded in the received signal.

In some embodiments the signal acquisition system 200 is configured an operable for concurrently determining whether any one of a plurality of m>1 different code-words is encoded in the received signal. In such embodiments the signal acquisition system 200 may for example include a plurality of at least m word convolution modules 240 similar to those described above, or additional one or more time frame signal processors 220' for processing different respective code words.

The signal acquisition system configured as in any of the above described examples of FIGS. 3A and 4A-4C, may be configured as a digital signal processing chip (system on chip) or part of a system on a chip. The input module may be associated with signal receiving channel connectable to an antenna module and including at least an analogue to digital converter adapted to sample an analogue signal from the antenna module and generate the received signal in digital form. The input module may be adapted to extract the time frames portions from the received signal as successive time frame portions of predetermined length successively shifted from one another by at least one signal sample.

The signal acquisition system as described above may be configured and operable to process the received signal to identify the at least one code word encoded in the signal and determine a time index (sample position) and whether the code word is encoded in the received signal and a carrier frequency over which the code word is encoded in the received signal.

The signal acquisition system described above can be implemented in the chip as H/W accelerator for the DSP, e.g. on the same chip of the DSP.

According to the above-described technique, time synchronization may be performed in a hierarchal manner. This may, for example, be implemented as follows: The signal, a communication frame thereof, is generally composed as a sequence of symbols. Considering for example the case of DVB-S2X, a symbol time can vary between 2 nsec (500M symbols per second) to 1 microsec (1M sps). Symbols are ordered in communication frames. In DVB-S2X frames are between 3000 to 35000 symbols, which translates to 6 microsec to 35 msec. Frames can be organized as super-frames containing about 600000 symbols. A superframe size may then be between 1.2 msec to 600 msec. Frames or superframe transmission times are therefore an integer multiple of the above. The acquisition engine/system 200 described above provides synchronization at a frame level. Symbol level synchronization can be performed at the modem itself using known algorithms (Gardner). Standardized methods (GPS, IEEE 1588 and Network Clock Reference (NCR) provide means to synchronize transmission times.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A signal acquisition system comprising:
   an input adapted to obtain a received signal which encodes communicated data over a certain unknown carrier frequency, being any one of a plurality of possible carrier frequencies residing within a predetermined frequency band;
   a signal time frame processor connectable to the input and configured and operable for continuous processing of time frame portions of the received signal to identify at least one code word of a group of one or more predetermined code words, being encoded in a time frame portion of the received signal; said signal time frame processor comprises:
   a. a carrier frequency analyzer module configured and operable for analyzing said a time frame portion of the received signal in conjunction with said plurality of possible carrier frequencies simultaneously, by transforming said time frame portion to generate carrier-data including a plurality of carrier-data-pieces associated with each possible carrier frequency of said plurality of possible carrier frequencies respectively, whereby each of said carrier-data piece being indicative of data encoded in said time frame portion over a carrier frequency associated with said carrier-data piece; and
   b. a convolution module configured and operable for processing the time frame portion of the signal to simultaneously identify whether said time frame portion encodes said at least one code word, over any one of said a plurality of possible carrier frequencies; and
   an output module configured and operable for outputting identification data indicative of identification of said code word in said signal;
   wherein said time frame processor is adapted to determine a time index of said code word in the received signal based on said time frame portion of the received signal at which said code word is identified; and wherein said output module is further adapted to output said time index.

2. The signal acquisition system of claim 1 wherein said time frame processor is adapted to process said carrier data to identify the carrier-data piece which encodes significant data and thereby determine said carrier frequency of the received signal; and wherein said output module is further adapted to output said determined carrier frequency.

3. The signal acquisition system of claim 1 wherein said carrier frequency analyzer module comprises a plurality of n signal mixers configured an operable for processing the received signal simultaneously whereby said plurality of signal mixers are adapted to apply a plurality of n respectively different predetermined frequency shifts to the received signals and thereby generate a plurality of n respectively different frequency shifted signals having their carrier frequencies shifted respectively by said different predetermined frequency shifts relative to said certain undetermined carrier frequency of the received signal.

4. The signal acquisition system of claim 3 wherein said plurality of signal mixers are operable for applying said respectively different frequency shifts such that the shifted carrier frequencies of said plurality of frequency shifted signals span a range of said predetermined frequency band.

5. The signal acquisition system of claim 3 wherein said convolution module comprises a plurality of at least n correlator modules connectable to said plurality of n signal mixers respectively and configured and operable for simultaneously convolving said plurality of frequency shifted signals respectively with said code word, to thereby generate a n convolved signal representations indicative of whether said code words is encoded in said frequency shifted signals respectively.

6. The signal acquisition system of claim 5 wherein said convolution module comprises a plurality of at least n×m correlator modules, whereby m being an integer number greater than one; and wherein each group of m correlator modules of said n×m correlator modules is connectable to a respective one signal mixer of said plurality of n signal mixers and configured are configured for simultaneously convolving a respective frequency shifted signal obtained by said respective one signal mixer with up to m code word simultaneously; said convolution module thereby generates up to n×m convolved signal representations indicative of whether any one of said m code words is encoded in any one of said n frequency shifted signals respectively.

7. The signal acquisition system of claim 5 wherein said output module comprises a code word identification module comprising a comparison module adapted for comparing at least one convolved signal representation of said n convolved signal representations with a predetermined criteria and thereby to determine whether said code word is encoded in the frequency shifted signal corresponding to said convolved signal representation.

8. The signal acquisition system of claim 1 wherein said convolution module comprises a word convolution module comprising:
    a. a plurality of $k^{(1)}$=n delay modules configured and operable for applying $k^{(1)}$ different time delays to the received signal and thereby generate $k^{(1)}$ respective time delayed signals being copies of said received signal delayed by said $k^{(1)}$ respective time delays; and
    b. at least a first word convolution stage $S^{(1)}$ comprising:
        i. a code word provision module adapted to provide $k^{(1)}$ data portions indicative of n symbol constituents of said code word; and
        ii. a plurality of $k^{(1)}$ symbol convolution modules; whereby each symbol convolution module of said plurality of $k^{(1)}$ symbol convolution modules is connectable to a respective delay module of said plurality of delay modules, for receiving therefrom a corresponding time delayed signal, which is generated thereby, and is connectable to said code word provision module for receiving corresponding symbol constituent of said $k^{(1)}$ symbol constituents which location in said code words corresponds to the respective time delay of the time delayed signal of the respective delay module, and configured and operable for convolving said time delayed signal with said corresponding symbol constituent to generate a respective symbol-convolved signal representations indicative of whether said symbol constituent is encoded in the corresponding time delayed signal; said $k^{(1)}$ symbol convolution modules thereby generate $k^{(1)}$ symbol-convolved signal representations indicative of whether said $k^{(1)}$ symbol constituents of the code word are encoded in a timely order in said received signal.

9. The signal acquisition system of claim 8 wherein said carrier frequency analyzer module comprises a time to frequency transformation module adapted for receiving said $k^{(1)}$ symbol-convolved signal representations from said code word convolution module and configured and operable for applying time to frequency transformation to said $k^{(1)}$ symbol-convolved signal representations to obtain a frequency based representation of said n-symbol-convolved signal representations.

10. The signal acquisition system of claim 9 wherein said time to frequency transformation is a Fourier transform.

11. The signal acquisition system of claim 10 wherein said time to frequency transformation is applied utilizing at least one of FFT and DFT.

12. The signal acquisition system of claim 9 wherein:
    a peak in said frequency based representation satisfying a predetermined criteria (threshold) indicates said code word being encoded in the received signal;
    a frequency index of said peak in said frequency based representation indicates a shift of the carrier frequency of said received signal; and
    an intensity of said peak indicates significance level of said code word being encoded in the received signal.

13. The signal acquisition system of claim 12 wherein said output module comprises a code word identification module comprising a comparison module adapted for comparing said intensity of said peak indicates with a predetermined criteria and thereby to determine whether said code word is encoded in the received signal.

14. The signal acquisition system of claim 9 wherein said word convolution module comprises a convolution stage cascade comprising said first convolution stage $S^{(1)}$ and one or more cascaded additional convolution stages $S^{(2)}$ to $^{(L)}$ each of the additional convolution stages $S^{(L)}$ being configured and operable for receiving the $k^{(L-1)}$ symbol-convolved signal representations from convolution stage $S^{(L-1)}$ preceding and aggregating the symbol-convolved signal representations to generate a set having a lower number of $k^{(L)}$=$k^{(L-1)}$/N symbol-convolved signal representation pertaining to larger symbols of the code word; and
    a selector configured and operable for selectively operating said time to frequency transformation module based on the symbol-convolved signal representations obtained from a selected stage of the set of adapted for receiving said $k^{(1)}$ symbol-convolved a selected one of the convolution stages thereby enabling controllable adjustment of processing power requirements and accuracy of identification of said code word in the received signal.

15. The signal acquisition system of claim 8 comprising a plurality of at least m>1 word convolution modules associated with different respective code words and configured and operable for simultaneously determining whether said received signal encodes any one of said m code words.

16. The signal acquisition system of claim 1 being configured as a digital signal processing chip.

17. The signal acquisition system of claim 16 wherein said input is associated with signal receiving channel connectable an antenna module and comprising at least an analogue to digital converter adapted to sample an analogue signal from said antenna module and generate said received signal in digital form; and
    wherein said input is adapted to extract said time frames portions as from the received signal as successive time frame portions of predetermined length successively shifted from one another by at least one signal sample.

18. The signal acquisition system of claim 1 being configured and operable to process the received signal to identify said at least one code word encoded in the signal and determine a time index (sample position) and which said code word is encoded in the received signal and a carrier frequency over which said code word is encoded in the received signal.

19. A satellite communication terminal adapted for receiving a plurality of designated communication frames transmitted in a forward link from a satellite to said terminal, wherein said satellite operates in a beam-hopping mode and said communication terminal is associated with a certain group of one or more respective groups of communication terminals associated with respective beams transmitted by said satellite in said beam-hopping mode;
  wherein the satellite communication terminal comprises:
    a signal receiver configured and operable for performing signal receipt operation during a forwards link transmission of a respective beam of the beam-hoping mode which is associated with the certain group for receiving and processing the communication frame transmitted in said forward link from said satellite; and
    wherein said signal receiver comprises a signal acquisition system according to claim 1 configured and operable to process at least a part of the communication frame received in the forward link from said satellite and to apply carrier locking on to a carrier frequency of said respective beam by identifying at least one code word in the respective communication frame and determine a time index at which said code word is encoded in the received signal and a carrier frequency over which said code word is encoded in the received signal.

20. A satellite communication terminal adapted for receiving a plurality of designated communication sub frames transmitted in a forward link from a satellite to said terminal, wherein said communication terminal is associated with a certain group of one or more respective groups of satellite communication terminals, and each designated communication sub frame is a respective portion of a communication frame, which transmitted from said satellite in said forwards link and comprises N communication sub frames designated to serves respective one or more groups of satellite communication terminals;
  wherein the satellite communication terminal comprises:
    a scheduler configured and operable for determining a time slot of said designated communication sub frame within the communication frame transmitted by the satellite; said scheduler comprises:
      a forward link scheduler configured and operable for assigning a forwards link schedule for receiving said designated communication sub frame at said time slot; and
      a return link scheduler configured and operable for assigning a return link schedule for transmitting information to the satellite during time slots other than said time slot of the designated communication sub-frame; and
    a signal receiver associated with said scheduler and configured and operable for performing signal receipt operation during said forwards link schedule for receiving and processing said designated sub frame of the communication frame transmitted in said forward link from said satellite;
    wherein said signal receiver comprises a signal acquisition system according to claim 1.

21. The satellite communication terminal according to claim 20 wherein said signal acquisition system is configured and operable to process at least a part of the communication frame received in the forward link from said satellite and to lock on to said designated communication sub-frame by identify at least one code word in the received signal designating said designated sub-frame and determine a time index (sample position) at which said code word is encoded in the received signal and a carrier frequency over which said code word is encoded in the received signal.

22. The satellite communication terminal according to claim 20 wherein a signal transmitter and the signal receiver thereof are configured for operating at mutually exclusive time slots for transmitting and receiving said return and forward links respectively.

23. The satellite communication terminal according to claim 22 wherein said signal receiver does not activate carrier frequency locking during said return link schedule thereby allowing a carrier frequency of said forward link to drift out of tune; and wherein said signal acquisition system is configured for operating upon said forward link schedule for simultaneously analyzing a time frame portion of the received forward link signal, in conjunction with a plurality of possible carrier frequencies to determine in real time an actual carrier frequency of the forwards link signal received by the terminal.

24. The satellite communication terminal according to claim 23, wherein said period of non-activation is caused by a transmitter operating in a beam-hopping mode.

25. The satellite communication terminal according to claim 20, wherein said scheduler is configured and operable for generating a request for allocation of return link capacity in another beam or a different satellite, thereby when a terminal switches a beam or a satellite, it is able to immediately utilize said allocated capacity over the new (switched-to) beam or at the new satellite.

* * * * *